US011188657B2

(12) United States Patent
Jean-Louis

(10) Patent No.: US 11,188,657 B2
(45) Date of Patent: Nov. 30, 2021

(54) METHOD AND SYSTEM FOR MANAGING ELECTRONIC DOCUMENTS BASED ON SENSITIVITY OF INFORMATION

(71) Applicant: NETGOVERN INC., Montreal (CA)

(72) Inventor: Ludovic Jean-Louis, Montreal (CA)

(73) Assignee: NETGOVERN INC., Montreal (CA)

( * ) Notice: Subject to any disclaimer, the term of this patent is extended or adjusted under 35 U.S.C. 154(b) by 439 days.

(21) Appl. No.: 16/409,229

(22) Filed: May 10, 2019

(65) Prior Publication Data

US 2019/0347429 A1   Nov. 14, 2019

Related U.S. Application Data

(60) Provisional application No. 62/670,741, filed on May 12, 2018.

(51) Int. Cl.
| | |
|---|---|
| *G06F 21/60* | (2013.01) |
| *G06F 16/35* | (2019.01) |
| *G06F 16/38* | (2019.01) |
| *G06F 21/57* | (2013.01) |
| *G06F 21/64* | (2013.01) |

(Continued)

(52) U.S. Cl.
CPC .......... *G06F 21/602* (2013.01); *G06F 16/353* (2019.01); *G06F 16/38* (2019.01); *G06F 21/577* (2013.01); *G06F 21/6245* (2013.01); *G06F 21/64* (2013.01); *G06N 20/00* (2019.01)

(58) Field of Classification Search
CPC ...... G06F 21/602; G06F 16/353; G06F 16/38; G06F 21/577; G06F 21/64; G06F 21/6245; G06N 20/00; G06N 5/003; G06N 20/10; G06N 7/005; G06N 20/20; G06N 5/022
See application file for complete search history.

(56) References Cited

U.S. PATENT DOCUMENTS

| 6,094,731 A | 7/2000 | Waldin et al. |
| 8,561,185 B1 * | 10/2013 | Muthusrinivasan ........................ G06F 21/6245 726/22 |

(Continued)

FOREIGN PATENT DOCUMENTS

| EP | 1655682 | 5/2006 |
| EP | 3449414 | 3/2019 |
| WO | 2015042808 | 4/2015 |

*Primary Examiner* — Matthew Smithers
*Assistant Examiner* — Mirza Israr Javed
(74) *Attorney, Agent, or Firm* — Benoit & Cote Inc.; Charles-André Caron

(57) ABSTRACT

There is described a method for determining a level of sensitivity of information in an electronic document. The method comprises scanning a computer location to select the electronic document, such as an unstructured document in which the sensitive nature of a given portion of the contents is not trivial. In the electronic document, contents and metadata of the electronic document are scanned, and each occurrence of sensitive data is identified by classifying each portion of the contents forming the electronic document as sensitive, or not sensitive, per se. For each occurrence of the sensitive data, there are determined a type of the sensitive data and a risk score associated to the type of the sensitive data, for example from a knowledge base. Using the risk score of each occurrence of the sensitive data, one can determine an exposure risk score of the electronic document.

18 Claims, 2 Drawing Sheets

(51) Int. Cl.
  *G06N 20/00* (2019.01)
  *G06F 21/62* (2013.01)

(56) References Cited

U.S. PATENT DOCUMENTS

| | | | |
|---|---|---|---|
| 8,881,292 B2 | 11/2014 | Mahaffey | |
| 8,925,099 B1* | 12/2014 | Saxe | G06F 21/577 |
| | | | 726/26 |
| 8,996,350 B1* | 3/2015 | Dub | G06F 16/353 |
| | | | 704/1 |
| 9,892,441 B2 | 2/2018 | Barday | |
| 9,892,442 B2 | 2/2018 | Barday | |
| 9,892,444 B2 | 2/2018 | Barday | |
| 10,013,577 B1 | 7/2018 | Beaumont et al. | |
| 10,019,597 B2 | 7/2018 | Barday | |
| 10,026,110 B2 | 7/2018 | Barday | |
| 10,032,172 B2 | 7/2018 | Barday | |
| 10,043,008 B2 | 8/2018 | Costea et al. | |
| 10,102,533 B2 | 10/2018 | Barday | |
| 10,158,676 B2 | 12/2018 | Barday | |
| 10,165,011 B2 | 12/2018 | Barday | |
| 10,169,788 B2 | 1/2019 | Barday | |
| 10,169,789 B2 | 1/2019 | Barday | |
| 10,169,790 B2 | 1/2019 | Barday | |
| 10,176,503 B2 | 1/2019 | Barday | |
| 10,181,051 B2 | 1/2019 | Barday | |
| 10,204,238 B2 | 2/2019 | Sher-Jan et al. | |
| 10,242,228 B2 | 3/2019 | Barday | |
| 2003/0229525 A1 | 12/2003 | Callahan et al. | |
| 2004/0181665 A1 | 9/2004 | Houser | |
| 2007/0283171 A1 | 12/2007 | Breslin et al. | |
| 2010/0121773 A1 | 5/2010 | Currier et al. | |
| 2011/0078152 A1* | 3/2011 | Forman | G06F 16/325 |
| | | | 707/747 |
| 2012/0102543 A1 | 4/2012 | Kohli et al. | |
| 2012/0116923 A1 | 5/2012 | Irving et al. | |
| 2013/0311224 A1 | 11/2013 | Heroux et al. | |
| 2014/0298470 A1 | 10/2014 | Yablokov et al. | |
| 2015/0180908 A1 | 6/2015 | Dang et al. | |
| 2015/0229664 A1 | 8/2015 | Hawthorn et al. | |
| 2016/0110352 A1* | 4/2016 | Bendersky | G06F 21/6227 |
| | | | 707/602 |
| 2016/0277368 A1* | 9/2016 | Narayanaswamy | H04L 63/0281 |
| 2017/0270318 A1 | 9/2017 | Ritchie | |
| 2019/0347429 A1* | 11/2019 | Jean-Louis | G06F 21/64 |
| 2020/0099530 A1* | 3/2020 | Khatib | H04L 9/085 |
| 2021/0279722 A1* | 9/2021 | Magerkurth | H04L 63/10 |

\* cited by examiner

METHOD AND SYSTEM FOR MANAGING ELECTRONIC DOCUMENTS BASED ON SENSITIVITY OF INFORMATION

CROSS-REFERENCE TO RELATED APPLICATIONS

This application claims benefit or priority of U.S. provisional patent application 62/670,741, filed May 12, 2018, which is hereby incorporated herein by reference in its entirety.

BACKGROUND

(a) Field

The subject matter disclosed generally relates to computer security. More specifically, it relates to the determination of information sensitivity in electronic documents.

(b) Related Prior Art

Private information (also known as personal information, personally identifiable information) is defined by McCallister et al. (Guide to protecting the confidentiality of personally identifiable information (PII). Technical report, NIST, Gaithersburg, Md., United States, 2010) as "any information about an individual maintained by an agency, including (1) any information that can be used to distinguish or trace an individual's identity, such as name, social security number, date and place of birth, mother's maiden name, or biometric records; and (2) any other information that is linked or linkable to an individual, such as medical, educational, financial, and employment information".

To protect the privacy of the sensitive data multiple compliance regulations have been implemented by various countries. These regulations aim at enforcing that business processes, operations and practices are done according to the country's legislation. Examples of such regulations are Health Insurance Portability and Accountability Act (HIPAA) in the United States, the General Data Protection Regulation (GDPR) in the European Union or the Personal Information Protection and Electronic Documents Act (PIPEDA) in Canada.

Despite the existence of regulations, there have been important leakages of sensitive data. Various services such as online email or social networks have been the target of cyber attacks that have led to the public disclosure of users' sensitive data. For such services, the direct consequences are damage to their reputation and often loss of users. For the end-users the exposure of their sensitive data makes them candidate to identity theft or ransomware attacks. Beside online services, private organization are also responsible to prevent exposure of sensitive data from their employees or customers.

Computer security of computer networks comprising sensitive information is therefore in need for improvements.

SUMMARY

In this document we consider "sensitive data" and private information as equivalent. In addition, we refer to any file stored by an enterprise that can contain the sensitive data as an "enterprise document". An enterprise document is any electronic document that is exchanged within an organization, e.g., an email, a spreadsheet, a text file and the like. Special emphasis is put on files containing unstructured documents, for which identifying the sensitive data is not a trivial task. The method described herein below can be applied to structured files such as relational databases, although the interest is not significant in this case since the sensitive nature of the data is trivial from the labelling of the database, This is why the method is more advantageously applicable to unstructured documents comprising free texts and information that are not formally labelled or pre-classified. Note that, we consider the metadata associated with the enterprise document as part of that document. Example of metadata are author's name, various timestamps (e.g., date of creation, last modification date, etc.), type of enterprise document, etc.

According to an aspect of the invention, there is provided a method for determining a level of sensitivity of information in an electronic document, the method comprising:
  scanning a computer location to select the electronic document;
  in the electronic document, scanning contents of the electronic document and metadata of the electronic document;
  identifying each occurrence of sensitive data by classifying each portion of the contents forming the electronic document as sensitive, or not sensitive, per se;
  for each occurrence of the sensitive data, determining a type of the sensitive data and determining a risk score associated to the type of the sensitive data;
  using the risk score of each occurrence of the sensitive data to determine an exposure risk score of the electronic document.

According to an embodiment, there is further provided the step of scanning every electronic document at the computer location to determine a location risk exposure score of the computer location.

According to an embodiment, there is further provided the step of scanning every electronic document at every computer location of a network to determine a global risk exposure score of the network.

According to an embodiment, identifying each occurrence of sensitive data comprises using machine learning.

According to an embodiment, the determining a risk score for each occurrence of the sensitive data comprises using a knowledge base of the risk score associated to the type of the sensitive data.

According to an embodiment, scanning a computer location to select the electronic document comprises computing a cryptographic hash of the electronic document to skip the electronic document if the cryptographic hash thereof is already known.

According to an embodiment, computing the cryptographic hash to skip the electronic document if the cryptographic hash thereof is already known comprises using a Finite State Transducer to match the cryptographic hash which is computed against the Finite State Transducer to determine to skip the electronic document or not.

According to an embodiment, computing the cryptographic hash to skip the electronic document if the cryptographic hash thereof is already known comprises using a search engine querying a lookup table with the cryptographic hash which is computed to determine to skip the electronic document or not.

According to an embodiment, computing the cryptographic hash to skip the electronic document if the cryptographic hash thereof is already known comprises using a Sigmatch algorithm with the cryptographic hash which is computed to determine to skip the electronic document or not.

According to an embodiment, scanning the contents of the electronic document comprises scanning only unstructured contents of the electronic document.

According to an embodiment, identifying each occurrence of sensitive data in absence of a structure to determine a nature of the contents comprises using a machine learning algorithm to perform a classification task of determining the nature of the unstructured contents of the electronic document.

According to an embodiment, the machine learning comprises using a Naïve Bayes algorithm to perform the classification task.

According to an embodiment, the machine learning comprises using a support vector machine algorithm to perform the classification task.

According to an embodiment, the machine learning comprises using a support a random forest algorithm to perform the classification task.

According to an embodiment, after using the machine learning algorithm to perform the classification task, there is provided the step of using a knowledge base which uses a type of said each occurrence of the sensitive data to determine the risk score for each occurrence of the sensitive data.

According to an embodiment, scanning a computer location to select the electronic document comprises computing a cryptographic hash of the electronic document to skip the electronic document if the cryptographic hash thereof is already known.

According to an embodiment, there is further provided the step of scanning every electronic document at the computer location to determine a location risk exposure score of the computer location, wherein a computer comprising a plurality of shared folders comprises a corresponding plurality of computer locations.

According to an embodiment, there is further provided the step of scanning every electronic document at the computer location to determine a location risk exposure score of the computer location, wherein a plurality of computers all having access to a collaborative website or to a shared folder all define a single location for the collaborative website or the shared folder.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
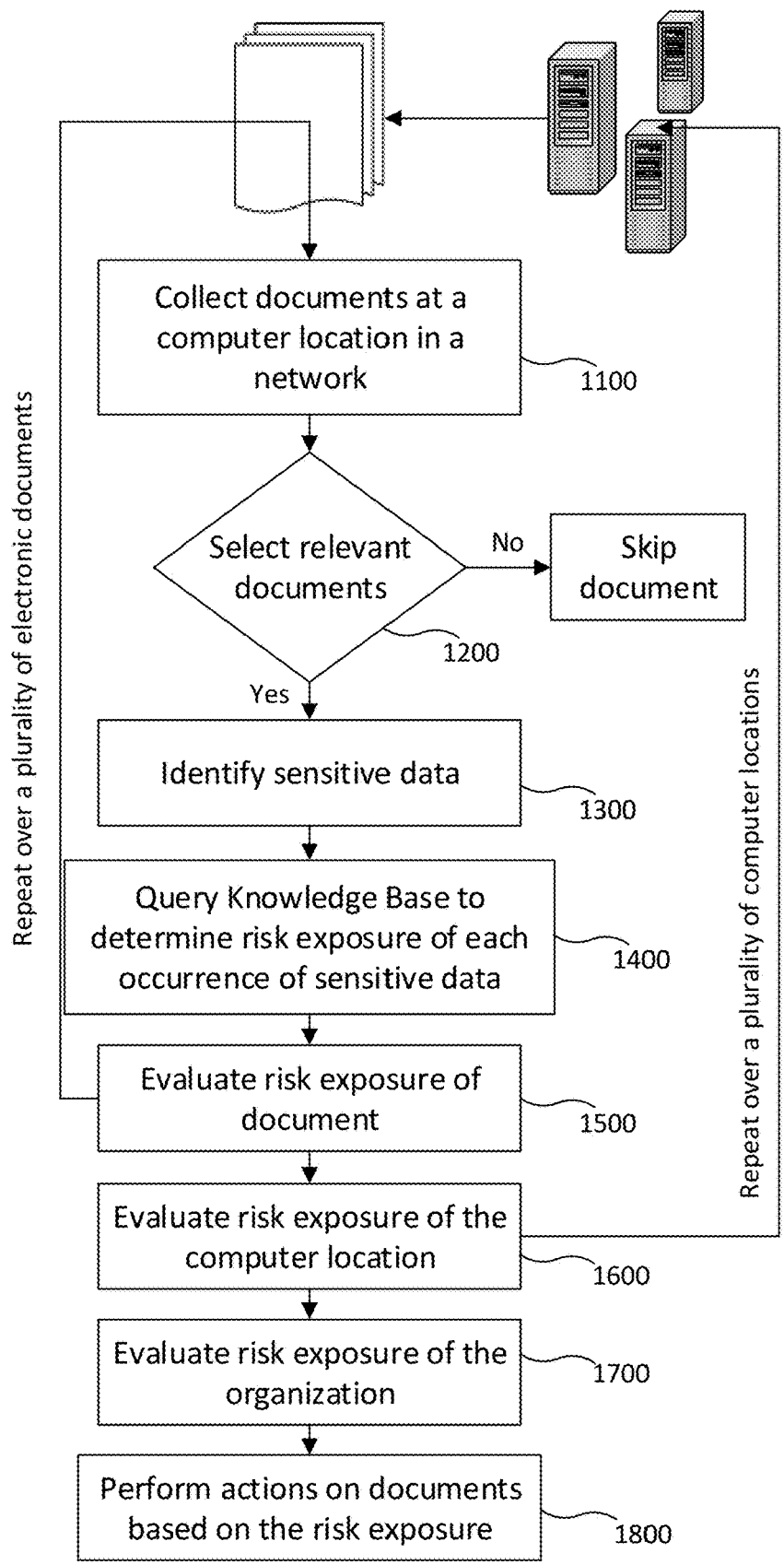
FIG. 1 is a flowchart illustrating a method for assessing a risk level of information sensitivity in a network of computers containing electronic documents, according to an embodiment.

There is described a method to assess a risk level of information sensitivity provided in electronic documents which are stored on specific computers belonging to a network such as an organizational network. More specifically, the method is applicable to electronic documents in which the sensitive information is not plainly visible and needs to be identified. In other words, it applied to electronic documents for which the identification of sensitive is not a trivial task. Presence and accessibility of sensitive information in relational databases are often contemplated in the prior art, but the identification of the sensitive nature of information therein is often trivial. For example, if a large user database contains labels such as "social security number" or "home address", then identifying that the specific data in this database are sensitive is a trivial task. The present invention addresses the cases for which this is non-trivial, i.e., the object is to identify sensitive data in electronic documents including those having unstructured contents in which the contents needs to be interpreted to identify the sensitive nature thereof. This can be considered as a classification task (output=sensitive or not sensitive) applicable to the unstructured contents of a given electronic document (the input being free text or other unstructured contents).

In practice, the output for the classification task applied on a single document may not be a clear-cut yes/no, and may be an output ranging between 0 and 1, or between −1 and 1. A predetermined threshold can be used to determine that a document is formally identified as sensitive when the output is over that threshold. Moreover, the exact numeric output of the classifier can be used to assess the degree of certainty of the sensitivity of information in that document, and can therefore conveniently be used as a risk score for the individual electronic document being considered.

Another issue with the sensitive information is that the information may not have the same level of sensitivity depending on where it is stored, because the applicable legal frameworks may differ depending on where the electronic document containing the sensitive information is stored. In the context of cloud computing or website or web application hosting, data can be stored in known but varied locations and may be involve transborder communications wither between servers or between a server and a client computer. Which regulations are applicable to these cases (storage and communications) depends on location, and the level of enterprise risk directly depends on which regulations are applicable. Therefore, the level of risk or exposure depends on the location where data is stored and whether the presence of such sensitive data was reported or not at the computer location, as discussed above.

There are thus described systems and methods for identifying sensitive data from enterprise documents located in specific computer locations. In addition to the identification per se, which is practical in computer security technology, such a technology would be applicable to evaluate the global exposure risk for an organization given a compliance regulation from the identified sensitive data of which the existence is virtually unknown prior to scanning (as it is not stored in explicit databases).

The method, as shown in the flowchart of FIG. 1, can include the following steps:

Step 1100: collecting enterprise document content and a set of metadata common to multiple data location, for example author, date of creation and the like.

Step 1200: selecting or filtering the collected documents to analyze only relevant documents.

Step 1300: identifying sensitive data from the content of the collected enterprise documents, using an extraction technique based on machine learning or, more simply, regular expressions, for example;

Step 1400: initially storing and representing the compliance rules in a regulation as a knowledge base (KB) on which a risk exposure score/label can be computed, and querying such KB to determine risk for each occurrence of sensitive data;

Step 1500: estimating the compliance risk exposure from the collected enterprise document, that makes use of the risk exposure KB;

Step 1600: estimating the global compliance risk exposure for a computer location given a target regulation base;

Step 1700: estimating the global compliance risk exposure for an organization given a target regulation base;

Step 1800: performing specific actions based on the risk exposure related to enterprise documents.

The identification of sensitive data, especially over a large quantity of documents, involves some challenges which are addressed here. More specifically, the method described herein makes an advantageous use of cryptographic hashes applied to file contents and metadata to render the method of identification more resource-friendly in terms of computing and bandwidth capacities, i.e., to make the scanning of a computer location faster. This is particularly useful since a great quantity of electronic documents of various sizes and located in various locations across the world may need to be analyzed.

In addition to the previous advantages, the method can be applied for multiple compliance regulations. This allows an organization to evaluate a risk exposure in different contexts, example under the PIPEDA act and under the HIPPA act, without having to analyze the entire data set for each regulation.

the method described herein may be useful in the enterprise-document migration use case. In that use case, enterprise-documents have to be moved from one data source (DS1) to another data source (DS2). For example, DS1 may be an internal storage server, and DS2 may be cold-storage on a cloud platform. Those in charge of the migration may be in charge of deciding which country should be chosen to host the data to migrate, the different country choices having different rates applied to the storage, different data transmission speeds for expected communications, and different regulations that are application. By using the method described herein, cloud storage migration systems can i) evaluate the compliance risk associated with DS1, ii) identify a subset of enterprise documents (DS1-SUB) that are safe to migrate (meaning this subset have a compliance risk that is zero), iii) migrate only the enterprise documents in DS1-SUB to S2. The method described herein ensures that no enterprise documents with sensitive data in S1 will be migrated to S2, and also ensures a more secure transport of electronic documents over different locations. It can also ensure that data migrations are made taking into account the differential applicability of regulations between countries.

Enterprise documents are often scattered in a plurality of locations, such as emails servers, shared drives, collaborative platforms, a public cloud infrastructure or a private cloud infrastructure. These locations are geographically scattered, or at least electronically scattered, on different computers which communicate via the network. With additional steps the method described herein can provide a compliance risk exposure for each location. This detailed result can be used to produce reports, dashboards or data visualization with the compliance exposure level. Such reports can be used in various uses cases such as compliance auditing or risk management.

Figure 2:
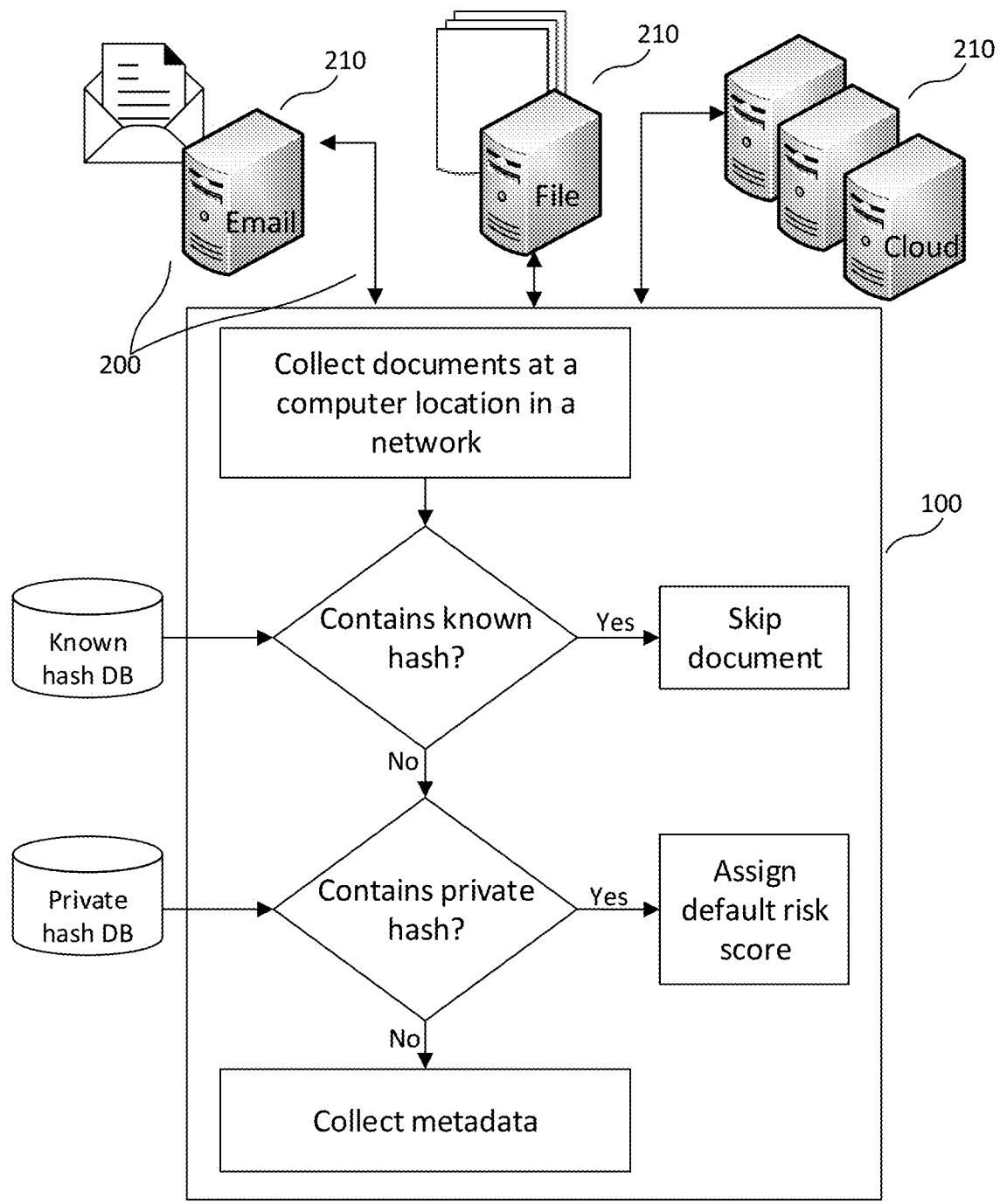
FIG. 2 is a schematic diagram illustrating a scanning computing device in relation with various computer locations and which perform steps on the scanned electronic documents to collect data in order to identify sensitive information and assess a level of sensitivity of the electronic documents, according to an embodiment.

In order to be performed, the method described below necessarily requires a computing system. More particularly, as shown in FIG. 2, the computing system should be a scanning computing device 100 in communication with the network 200 of computers 210 to be analyzed, or with the computer 210 to be analyzed in the case in which there is only one such computer. The scanning computing device 100 is thus able to collect and to scan the data it needs in order to assess their level of sensitivity.

The network 200 is defined as the collection of computers 210 which are connected together, directly or indirectly, by wired or wireless communication to exchange data.

Since internet has the ability to connect any computer, the definition of the network 200 should be adjusted by taking into account that the network 200 to be analyzed can be limited to the computers 210 under control of an organization, such that the network 200 being analyzed in the organization network.

The method comprises the step of scanning, by the scanning computing device 100, the contents of a target computer or network of target computers, the target computer being at a location or comprising a plurality of locations, as explained further below, in search of sensitive information in order to assess the risk level of each document, of each target computer in the network, and of the network at an organizational level.

The scanning computing device 100 should therefore be part of the network 200, as it can access all the relevant resources thereon by way of electronic communication.

In an embodiment, the scanning computing device 100 is also one of the target computers 210 to be analyzed.

In an embodiment, the network 200 comprises a single computer 210.

The method can be implemented by having a standalone (i.e., executable) program executed on the scanning computing device 100, or as an add-on to another software product (e.g., an antivirus or firewall program which can scan files at a location or tentatively transmitted into the computer) or from a remote location, e.g., as a script remotely accessing computers for scanning over the internet.

The scanning computing device 100 should comprise a processor to execute the instructions of the method, and a memory, in relation with the processor, to store, at least temporarily, the instructions to be executed. A communication port should also be present to allow the scanning computing device 100 to communicate with the network 200. The scanning computing device 100 and the infrastructure to communicate with the storage of the computers to scan are essential to perform the method.

Some of the challenges faced by organizations managing a network of computers are listed below:

Evolution of regulation: this relates to any modification of an existing regulation. It also includes adding/removing a type of sensitive data or even changing the definition of a sensitive data type. Organization need to track these evolutions and update their compliance enforcement systems accordingly.

Introduction of new regulation: this relates to supporting new compliance regulations that are added by the legislator. Depending on the amount of change required, supporting a new compliance regulation might be disruptive and require adding new systems such as new computer security software on servers, or new scripts which monitor use activity over the network, both technical responses that can be technically difficult to implement by the organization. This also applies to the evolution of regulation discussed above.

Geolocalized regulation: this relates to organizations that operate in multiple countries/jurisdictions. In such a case, they have to comply to various regulations, typically they need to provide different treatment to sensitive data based on where the data is processed or stored. A differential treatment on the data in the files located at different computer locations may thus need to be applied.

Multi-sector regulations: this relates to supporting regulations from multiple business sectors (verticals). Organizations that operate in different verticals need to ensure they are compliant with the regulations in each vertical they operate.

Therefore, regulations force the organizations which have to manage a network of computer resources to apply particular processes on the electronic documents on their network depending on computer location.

In addition to the regulation-related challenges, there are implementation issues that arise when an organization decides to enforce data compliance:

Data dispersion: enterprise documents circulate in the network using different means therefore documents with sensitive data are scattered through multiple enterprise and storage systems. We refer to these systems as data source or data location. Examples are mail servers, collaborative platforms, collaborative websites, enterprise content management platforms, shared folders, and the like. Therefore, a given location may be tagged to a specific computer, and a specific computer could also comprise a plurality of locations thereon. Conversely, all computers having access to a collaborative or shared folder or to a collaborative website or the like may all define the same computer location having regard to the specific shared folder or to a collaborative website (this is how a computer, having access to a variety of folders or server locations, can contain a plurality of locations thereon). This is especially true in the case of shared folders or platforms, or the cloud, which normally imply duplicating an electronic document over more than one physical location.

Heterogenous metadata: the metadata associated with an enterprise document are related to the type of data location. For example, a mail server provides the email address of the sender and recipients of an email while a file server provides access control lists (ACLs). As the metadata are not uniform, it is not possible, from a computer security point of view, to rely solely on them to manage enterprise documents with sensitive data.

No estimate of risk exposure: without a mechanism to detect and estimate the amount of sensitive data they hold, organizations cannot implement remediation measures to properly secure the sensitive data. Also, there are different compliance regulations and the risk exposure depends on the target regulation, unless such compliance is analyzed on a location-by-location basis as contemplated by the present method.

The compliance risk (or risk exposure, or risk) is herein defined as the fact that an organization may fail to comply with regulation (and, as a result, may be subject to financial penalties for example). The risk exposure is not estimated in terms of financial value, rather we propose to represent the risk exposure as a score or as a risk level.

According to an exemplary embodiment of the method, the risk score varies in the interval [0-100], where 0 indicates the lowest level of exposure while 100 indicates the highest level. For example, the risk score associated with an enterprise document that contains a personal address could be 10 while the score for a document with a social security number would be 100. The idea is that personal addresses could be considered less sensitive since such information could be available on public listings such as phone books.

According to another exemplary embodiment of the method, there is provided a risk level, which is an alternative to the risk score, it is based on a Likert-type scale. In this scale the risk exposure is associated with risk partitions that are associated with a label. The risk partitions have equal size (i.e., the score ranges are equal as shown in the table below) and can be mapped to a risk score. Table 1 shows an exemplary association between the risk levels and the risk interval associated thereto, with their risk score.

TABLE 1

| Risk scale | | |
|---|---|---|
| Level | Score range | Risk |
| 1 | 0-20 | No exposure |
| 2 | 20-40 | Acceptable exposure |
| 3 | 20-60 | Moderate exposure |
| 4 | 60-80 | Significant exposure |
| 5 | 80-100 | Critical exposure |

Therefore, even though it is a legal requirement, complying with regulations and following their evolution can be challenging tasks for organizations, especially those which have the monitor the storage and transmission of a great number of electronic documents over a plurality of computer locations.

There is described below a method to estimate the risk exposure for one data location. Advantageously, the same steps can be carried out or applied on all data at every location regardless of their type, e.g., the same steps are applied to email servers, shared servers, collaborative platforms and the like, at an organizational network level.

Enterprise Document Collection

In an embodiment, the method comprises iteratively scanning by the scanning computing device 100 through all the enterprise documents in a data location (e.g., a client computer such as a PC, a server of any type, documents on the cloud, etc.) to collect their content and related metadata of these enterprise documents.

Select Relevant Enterprise Documents

Processing large data sets at a plurality of computer locations can be optimized by not processing documents that are not relevant as they are not likely to contain any sensitive data. To identify such files, an embodiment of the method can comprise relying on external resources composed of cryptographic hash values. Example of hashing algorithms are MD5, SHA1, and the like. We provide below two examples that are used in the system.

H1. A first list of hash values (i.e., a list of known hashes in a database) can be built and then provided for reference for enterprise documents to ignore as they are known to have no risk exposure (i.e., a zero-risk score can be assigned thereto). Example of such enterprise documents are files related to the operating system, executable files, and the like. The National Institute of Standards and Technology (NIST) provides the Reference Data Set (RDS) which is a public dataset of hash values for known systems. The system can optionally rely on this dataset to ignore some enterprise documents.

H2. A second list of hash values (i.e., a list of private hashes in a database) can be built and then provided for reference for enterprise documents that are known to have highly confidential content. For example, some specific documents (e.g., design documents) could be stored in one data location with specific security requirements (encryption, firewall protection, and the like). The hash values for these enterprise documents could be associated with a predefined exposure risk score/label (e.g. 100/critical) to increase the global risk exposure in case they are detected outside this data location. If detected, a default, predefined risk score can be assigned to the document. This can also make the identification of sensitive information faster, for example if a firewall is programmed to monitor emails to out-of-the-network recipients and detect these specific private hashes to prevent leakage.

The lists of cryptographic hash values can be very large, for example the RDS list contains several millions of entries. Different methods can be performed by the scanning computing device 100 executing the program of the method to efficiently check if the hash value of an enterprise document is contained in an external resource:

1) Automaton-based approach: this approach relies on Finite State Transducers (FST). One transducer is built using all the hash values associated with an external resource. To validate if an enterprise document belongs to an external resource, the system matches the document hash against the FST.

2) Indexing approach: this approach relies on a search engine. The hash values associated with the resources are stored in an inverted list that maps the external resource to the hash value. To validate if an enterprise document belongs to an external resource, the system queries the inverted list (lookup table).

3) Multi-pattern approach: this approach relies on matching one enterprise document hash value against all the hash values associated with an external resource. Methods such as SigMatch (Kandhan et al., Sigmatch: Fast and scalable multi-pattern matching. 3:1173-1184, September 2010.) or other algorithms can be utilized.

The enterprise documents that have been identified in the H1 list are discarded and not collected for the rest of the risk exposure estimation, thus making the whole process faster and more computing resource-friendly.

Metadata Collection

Depending on the data location different sorts of metadata could be available. To tackle this problem the method described herein relies on a unified set of metadata founded on metadata from multiple sorts of data location. This set of metadata contains simple and advanced metadata types.

Examples of simple metadata types are the name of the author of the enterprise document, the creation date of the document, the type of data location and the like. The system relies on a mapping between the type of data location and the unified set of metadata to decide the value of a metadata. For example, the sender property of an email and the owner of a file on a file server, will both be mapped to the author metadata of the enterprise document.

Advanced metadata are produced either by combining multiple metadata values or doing computation based on existing metadata values. An example of advanced metadata is the "freshness", it can be computed by measuring the duration between the current date and the creation data of an enterprise document.

In addition, the metadata are utilized to build a network of communication based on the author/reader relationships that occur when sharing enterprise documents. These relationships are represented differently depending on the type of data location. In email data locations, the author/reader relationship is captured by the sender and recipient MIME headers. In shared folder data locations, the author/reader relationship is captured by the access control list, the owner of the file can be viewed as the author, while the readers are any users who have access to the file.

Risk Exposure Knowledge Base

The method uses the knowledge base that was built previously to retrieve information related to the target regulation. This knowledge base provides a list of sensitive data type and the corresponding exposure risk. Example of sensitive data type are social security number, credit card number, driver license, personal address, and the like, which can be found in electronic documents.

Note that the knowledge base can also be extended to include information concerning users (or groups of users). The goal is to capture the risk exposure resulting from a user (group of users) having access to a certain data location. Table 2 shows an example of entry of the knowledge base for few users and different regulations. "Public" refers to a user group while "Joe Smith" and "Sally Smith" refer to individual users. As defined in the table, all documents in the data location "/shared/Personal", will be associated with a risk level 5 (or critical), under the HIPAA regulation, if they contain social security numbers and are accessible by users that are part of the "Public" group. This particular risk level classification is performed using the knowledge base, as it uses particular rules based on the context. This is distinct from the prior recognition of "Joe Smith" and "Sally Smith" as individual user names, which involves a machine learning algorithm or any other equivalent to identify that it is a name, which bears some level of risk per se. Therefore, the particular identification of information as being sensitive information is done by the machine learning algorithm acting as a classifier (output of the classifier=sensitive or not sensitive), and then, the sensitive information can be contextualized using the knowledge base to determine a risk level based on the location and on the particular regulation(s) under which the risk is assessed. Files identified as having no sensitive information are not subject to operations using the knowledge base.

TABLE 2

Compliance knowledge base sample

| Regulation | Data location | Risk level | Risk score | Sensitive data type | User |
|---|---|---|---|---|---|
| HIPAA | /shared/Personal | 1 | 0 | ZIP code | Joe Smith |
| HIPAA | /drive1/Documents/Sally | 1 | 0 | Patient id | Sally Smith |
| HIPAA | /drive1/Documents/Sally | 5 | 98 | Patient id | Joe Smith |
| Sarbanes Oxley | /drive1/Documents/Sally | 2 | 20 | Address | Joe Smith |
| HIPAA | /shared/Personal | 5 | 95 | SSN | Public |

Sensitive Data Extraction

As mentioned above, the enterprise document contents are sent to the sensitive data extraction component. According to an embodiment, this component relies on a machine learning based approach to extract the occurrences of the sensitive data type from the enterprise document content. To be able to work, a list of sensitive data types should be fed to the algorithm for training the algorithm to recognize the sensitive data types prior to the operational use of the algorithm. In another embodiment, the sensitive data extraction component could be replaced by a set of regular expressions, or any external software that provides sensitive data extraction functionality.

Using the machine learning algorithm is advantageous in that it is powerful enough, provided that it is properly trained, to classify a portion of the contents as being sensitive or not using only the portion of the contents per se. This means that the algorithm does not have to rely on other portions of the documents such as a table title, a legend, or a label of a column or row in a database or other tabular collection of data. Instead, the machine learning algorithm can learn to recognize that a portion of the contents of the documents is sensitive per se. For example, the following portions of contents, "111 111 111" or "111-11-0000", can be considered per se to be a social security number and classified as sensitive, based only on themselves and regardless of other portions of the content in the document. Therefore, portions of the contents are classified as sensitive per se, regardless of other portions in the document. Being able to do this is very advantageous when data is not structured in the document because there is not clue otherwise to determine the sensitive nature and the type of sensitive information of a given portion of the contents, unlike in a relational database.

Example of documents with unstructured contents would include, for example, Word® documents, PowerPoint® documents, PDF documents, emails, and other documents comprising free texts or unstructured information, i.e., not structured as a database or other format that can be queried and for which the fields are known. Such documents are rich in information but the sensitive nature thereof is not trivial for a computer given the lack of structure and impossibility to query.

While much emphasis has been put on text contents, it should be noted that the method can be applicable to other formats which can be converted into text. For example, speech-to-text and optical character recognition exhibit high performance and can be used to convert speech-containing videos or text-containing images into text that can be analyzed.

Risk Estimation for an Enterprise Document

The component is used to estimate the compliance risk score associated with an enterprise document. To compute this score, the method takes into account multiple features:

Sensitive data: the list of sensitive data identified from the content of the document.

Risk score: a score is associated with each sensitive data type to capture how confidential the data is. This score is provided by i) the KB or ii) an external resource;

Data location risk score: this relates to a risk score associated with a data location. For example storing enterprise documents on a public cloud can be considered less secure than storing the same document on a shared folder accessible only through a firewall. This score varies in the interval [0-100] and can be considered as a level of safety associated with the data location;

Sensitive topics: this relates to the presence/absence of a list of terms in the content of the enterprise document. This could be viewed as a black-list of terms that are considered highly confidential for a specific organization. For example, the name of a new product or new project will be considered as secret until it has been released publicly;

Enterprise document access this relates to the number of users that have access to the enterprise document. For example a document that contains sensitive data such as a social security number that is accessible only by its author implies less risk exposure than one that is accessible by the entire organization. To assess a level of accessibility of an enterprise document, the method relies on the network of communication built using the metadata;

Known hash value: this relates to the presence/absence of the crypographic hash value of the enterprise document in an external resource (e.g. H1 or H2).

The previous features are used to train a statistical model that takes a binary decision on whether the enterprise document is sensitive. This is a classification task. Various machine learning algorithms can be used for the training phase of that model, for example Naive Bayes, Support Vector Machine (SVM), Random Forests and the like, and then serve as the classifier. Other algorithms for classification can be used.

Once the classifier is trained, it is applied on all the enterprise documents of a data location. For the enterprise documents that have been labelled as containing sensitive information by the classifier, the confidence score (i.e., the output of the classifier which is often expressed in a 0-1 scale) is used to represent the exposure risk score of that document.

For example, scanning the computer location would comprise the step of scanning the contents of an individual electronic document. The interest here would lie in determining the presence of sensitive content in an unstructured electronic document. Indeed, there is no point in identifying that a database comprising a row of social security numbers include social security numbers, because this is normally known at management level and the existence of this information and the sensitive nature thereof are already known. The interest lies rather in identifying the sensitive information which is stored "casually" or without active knowledge of its sensitive nature, especially in a large collection of documents having unstructured contents therein (i.e., not a relational database).

As an alternative to the machine-learning based approach, the risk exposure for an enterprise document can be computed with a weighted average of the risk score associated with the sensitive data in the document. The weighted average can be computed using:

$$estimate_w(doc) = \frac{1}{\sum_{j=1}^{k} w_j} \sum_{e=1}^{n} w(e) * score(e)$$

where w(e) represents the risk weight associated with sensitive data e, score(e) is the risk score associated with e, n is the total number of sensitive data in the enterprise document doc and $\sum_{j=1}^{k} w_j$ is the sum of all the weight values.

Risk Exposure for a Data Location

The total risk exposure for a data location is based on the risk exposure score of all the enterprise documents that it contains. In practice, the risk exposure is an average of the risk exposure of all the enterprise documents. The risk is computed using:

$$estimate(loc) = \frac{1}{N} \sum_{d=1}^{N} risk(d)$$

where N is the total number of enterprise documents in a data location loc, d is an enterprise document in loc, and risk(d) is the exposure risk associated with the enterprise document d.

Alternative methods can also be applied to estimate the risk exposure for a data location. For instance, the risk exposure of a data location could be the maximum/minimum risk score of all the documents.

While many prior art methods focus on employee compliance with data privacy, the present method rather focuses on computer locations, which are more in line with data governance and usage, storage policies, and data migration operations, and can also be determined per se, i.e., the computer location has a risk exposure that depends on its contents and location, and not on who has access to it. For example, employee knowledge of regulations is immaterial to the risk score exposure of a computer location.

Global Risk Exposure Estimation

When processing multiple data locations, the global exposure risk is computed based on the exposure risk on each data location. Precisely, the global risk is an average of the risk exposure of all the data locations.

Compliance Actions

The risk exposure provides a way to detect the enterprise documents that have sensitive content. To mitigate the risk, the system is used to define some actions that are executed on the enterprise documents when a risk level/score is reached. Examples of actions include but are not limited to, send a notification to a system administrator or a user (e.g. the owner of the file), move the document to a different data location, change the ACLs, and the like.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A method for determining a level of sensitivity of information in an electronic document, the method comprising:
    scanning a computer location to select the electronic document;
    in the electronic document, scanning contents of the electronic document and metadata of the electronic document;
    identifying each occurrence of sensitive data by classifying each portion of the contents forming the electronic document as sensitive, or not sensitive, per se;
    for each occurrence of the sensitive data, determining a type of the sensitive data and determining a risk score associated to the type of the sensitive data;
    using the risk score of each occurrence of the sensitive data to determine an exposure risk score of the electronic document.

2. The method of claim 1, further comprising scanning every electronic document at the computer location to determine a location risk exposure score of the computer location.

3. The method of claim 2, further comprising scanning every electronic document at every computer location of a network to determine a global risk exposure score of the network.

4. The method of claim 1, wherein identifying each occurrence of sensitive data comprises using machine learning.

5. The method of claim 1, wherein the determining a risk score for each occurrence of the sensitive data comprises using a knowledge base of the risk score associated to the type of the sensitive data.

6. The method of claim 1, wherein scanning a computer location to select the electronic document comprises computing a cryptographic hash of the electronic document to skip the electronic document if the cryptographic hash thereof is already known.

7. The method of claim 6, wherein computing the cryptographic hash to skip the electronic document if the cryptographic hash thereof is already known comprises using a Finite State Transducer to match the cryptographic hash which is computed against the Finite State Transducer to determine to skip the electronic document or not.

8. The method of claim 6, wherein computing the cryptographic hash to skip the electronic document if the cryptographic hash thereof is already known comprises using a search engine querying a lookup table with the cryptographic hash which is computed to determine to skip the electronic document or not.

9. The method of claim 6, wherein computing the cryptographic hash to skip the electronic document if the cryptographic hash thereof is already known comprises using a Sigmatch algorithm with the cryptographic hash which is computed to determine to skip the electronic document or not.

10. The method of claim 1, wherein scanning the contents of the electronic document comprises scanning only unstructured contents of the electronic document.

11. The method of claim 10, wherein identifying each occurrence of sensitive data in absence of a structure to determine a nature of the contents comprises using a machine learning algorithm to perform a classification task of determining the nature of the unstructured contents of the electronic document.

12. The method of claim 11, wherein the machine learning comprises using a Naïve Bayes algorithm to perform the classification task.

13. The method of claim 11, wherein the machine learning comprises using a support vector machine algorithm to perform the classification task.

14. The method of claim 11, wherein the machine learning comprises using a support a random forest algorithm to perform the classification task.

15. The method of claim 11, comprising, after using the machine learning algorithm to perform the classification task, using a knowledge base which uses a type of said each occurrence of the sensitive data to determine the risk score for each occurrence of the sensitive data.

16. The method of claim 15, wherein scanning a computer location to select the electronic document comprises computing a cryptographic hash of the electronic document to skip the electronic document if the cryptographic hash thereof is already known.

17. The method of claim 16, further comprising scanning every electronic document at the computer location to determine a location risk exposure score of the computer location, wherein a computer comprising a plurality of shared folders comprises a corresponding plurality of computer locations.

18. The method of claim 16, further comprising scanning every electronic document at the computer location to determine a location risk exposure score of the computer location, wherein a plurality of computers all having access to a collaborative website or to a shared folder all define a single location for the collaborative website or the shared folder.

* * * * *